US012556256B2

(12) United States Patent
Yuan et al.

(10) Patent No.: US 12,556,256 B2
(45) Date of Patent: Feb. 17, 2026

(54) BEAM PARAMETER DETERMINATION FOR CHANNEL REPETITIONS

(71) Applicant: QUALCOMM Incorporated, San Diego, CA (US)

(72) Inventors: Fang Yuan, Beijing (CN); Yan Zhou, San Diego, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 18/252,850

(22) PCT Filed: Jan. 15, 2021

(86) PCT No.: PCT/CN2021/071998
§ 371 (c)(1),
(2) Date: May 12, 2023

(87) PCT Pub. No.: WO2022/147850
PCT Pub. Date: Jul. 14, 2022

(65) Prior Publication Data
US 2024/0014935 A1    Jan. 11, 2024

(30) Foreign Application Priority Data

Jan. 6, 2021 (WO) ................ PCT/CN2021/070409

(51) Int. Cl.
*H04B 7/06* (2006.01)
*H04L 1/08* (2006.01)
(Continued)

(52) U.S. Cl.
CPC ........... *H04B 7/06952* (2023.05); *H04L 1/08* (2013.01); *H04L 5/0053* (2013.01); *H04W 72/232* (2023.01)

(58) Field of Classification Search
CPC ....... H04L 1/08; H04L 5/0053; H04L 5/0023; H04L 5/0051; H04B 7/0695;
(Continued)

(56) References Cited

U.S. PATENT DOCUMENTS

2019/0075014 A1*  3/2019  Zhou ..................... H04W 24/02
2020/0022139 A1   1/2020  Zhou et al.
(Continued)

FOREIGN PATENT DOCUMENTS

CN    110892664 A    3/2020
CN    111901875 A    11/2020
(Continued)

OTHER PUBLICATIONS

Huawei, et al., "Enhancements on Multi-TRP for Reliability and Robustness in Rel-17", 3GPP TSG RAN WG1 Meeting #103-e, R1-2007587, Nov. 13, 2020 (Nov. 13, 2020), 12 Pages, section 2.
(Continued)

*Primary Examiner* — Kiet Tang
(74) *Attorney, Agent, or Firm* — Guang Y. Zhang; Harrity & Harrity, LLP

(57) ABSTRACT

Various aspects of the present disclosure generally relate to wireless communication. In some aspects, a wireless communication device may receive at least one channel repetition of a plurality of channel repetitions, wherein the at least one channel repetition comprises an indication associated with a beam parameter. The wireless communication device may perform a wireless communication action based at least in part on a determination associated with the beam parameter, wherein the determination associated with the beam parameter is based at least in part on an identification of a reference repetition occasion of a plurality of repetition occasions corresponding to the plurality of channel repetitions. Numerous other aspects are described.

30 Claims, 8 Drawing Sheets

(51) Int. Cl.
*H04L 5/00* (2006.01)
*H04W 72/232* (2023.01)

(58) Field of Classification Search
CPC .............. H04B 7/0408; H04B 7/06952; H04B 7/06964; H04W 72/232; H04W 52/54; H04W 72/0446; H04W 72/1268; H04W 72/21; H04W 72/231
See application file for complete search history.

(56) References Cited

U.S. PATENT DOCUMENTS

| | | | |
|---|---|---|---|
| 2020/0045709 | A1 | 2/2020 | Seo et al. |
| 2020/0084793 | A1 | 3/2020 | Bai et al. |
| 2020/0119869 | A1 | 4/2020 | Taherzadeh Boroujeni et al. |
| 2021/0144720 | A1* | 5/2021 | Xu ..................... H04L 5/0051 |
| 2023/0148282 | A1* | 5/2023 | Marinier ........... H04W 72/0446 370/329 |

FOREIGN PATENT DOCUMENTS

| | | |
|---|---|---|
| WO | WO-2017083489 A1 | 5/2017 |
| WO | WO-2019165239 | 8/2019 |

OTHER PUBLICATIONS

International Search Report and Written Opinion—PCT/CN2021/071998—ISA/EPO—Oct. 9, 2021.
International Search Report and Written Opinion—PCT/CN2021/070409—ISA/EPO—Oct. 9, 2021.
Xiaomi: "Enhancements on Multi-TRP for PDCCH, PUCCH and PUSCH", 3GPP Draft, 3GPP TSG RAN WG1 #103-e, e-Meeting, Oct. 26-Nov. 13, 2020, 18 Pages.
ZTE Corporation: "Discussion on Potential Techniques for Channels other than PUSCH and PUCCH", 3GPP Draft, 3GPP TSG RAN WG1 #103-e, R1-2007745, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020 Oct. 17, 2020 (Oct. 17, 2020), XP051939885, 14 Pages.
Supplementary European Search Report—EP21916903—Search Authority—Munich—Nov. 4, 2024.
INTERDIGITAL: "Evaluation of PDCCH repetition for URLLC", 3GPP TSG RAN WG1, Meeting #92bis, R1-1804853, Sanya, China, Apr. 16-20, 2018, Apr. 7, 2018, 8 Pages.

* cited by examiner

BEAM PARAMETER DETERMINATION FOR CHANNEL REPETITIONS

CROSS-REFERENCE TO RELATED APPLICATIONS

This Patent Application is a 371 national stage of PCT Application No. PCT/CN2021/071998 filed on Jan. 15, 2021, entitled "BEAM PARAMETER DETERMINATION FOR CHANNEL REPETITIONS," which claims priority to PCT Application No. PCT/CN2021/070409, filed on Jan. 6, 2021, entitled "BEAM PARAMETER DETERMINATION FOR CHANNEL REPETITIONS," and assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for beam parameter determination for channel repetitions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmission reception point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a wireless communication device for wireless communication includes a memory and one or more processors coupled to the memory, the memory and the one or more processors configured to: receive at least one channel repetition of a plurality of channel repetitions, wherein the at least one channel repetition comprises an indication associated with a beam parameter; and perform a wireless communication action based at least in part on a determination associated with the beam parameter, wherein the determination associated with the beam parameter is based at least in part on an identification of a reference repetition occasion of a plurality of repetition occasions corresponding to the plurality of channel repetitions.

In some aspects, a method of wireless communication performed by a wireless communication device includes receiving at least one channel repetition of a plurality of channel repetitions, wherein the at least one channel repetition comprises an indication associated with a beam parameter; and performing a wireless communication action based at least in part on a determination associated with the beam parameter, wherein the determination associated with the beam parameter is based at least in part on an identification of a reference repetition occasion of a plurality of repetition occasions corresponding to the plurality of channel repetitions.

In some aspects, a non-transitory computer-readable medium storing a set of instructions for wireless communication includes one or more instructions that, when executed by one or more processors of a wireless communication device, cause the wireless communication device to: receive at least one channel repetition of a plurality of channel repetitions, wherein the at least one channel repetition comprises an indication associated with a beam parameter; and perform a wireless communication action based at least in part on a determination associated with the beam parameter, wherein the determination associated with the beam parameter is based at least in part on an identification of a reference repetition occasion of a plurality of repetition occasions corresponding to the plurality of channel repetitions.

In some aspects, an apparatus for wireless communication includes means for receiving at least one channel repetition of a plurality of channel repetitions, wherein the at least one channel repetition comprises an indication associated with a beam parameter; and means for performing a wireless communication action based at least in part on a determination associated with the beam parameter, wherein the determination associated with the beam parameter is based at least in part on an identification of a reference repetition occasion of a plurality of repetition occasions corresponding to the plurality of channel repetitions.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
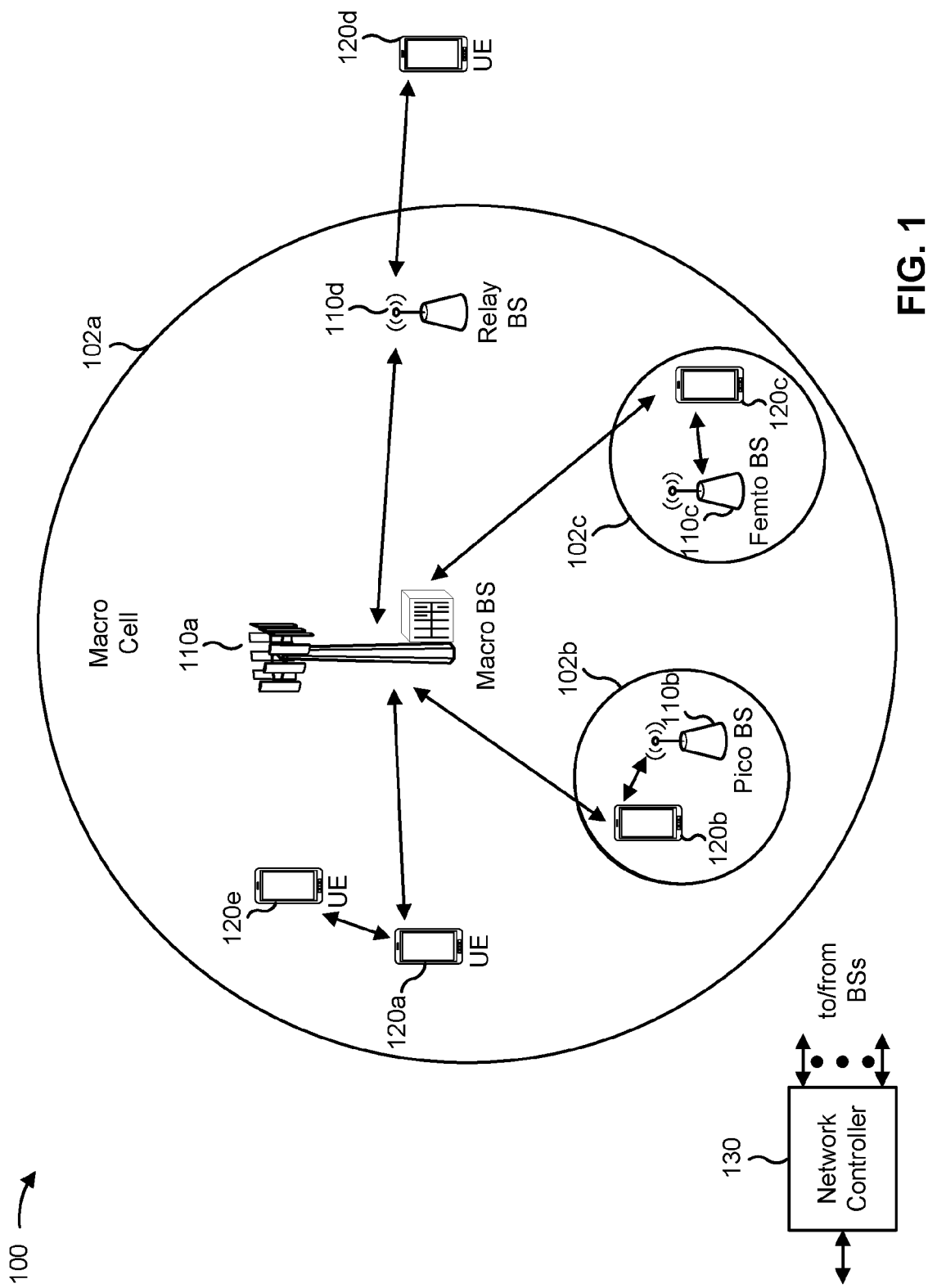
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a TRP, or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
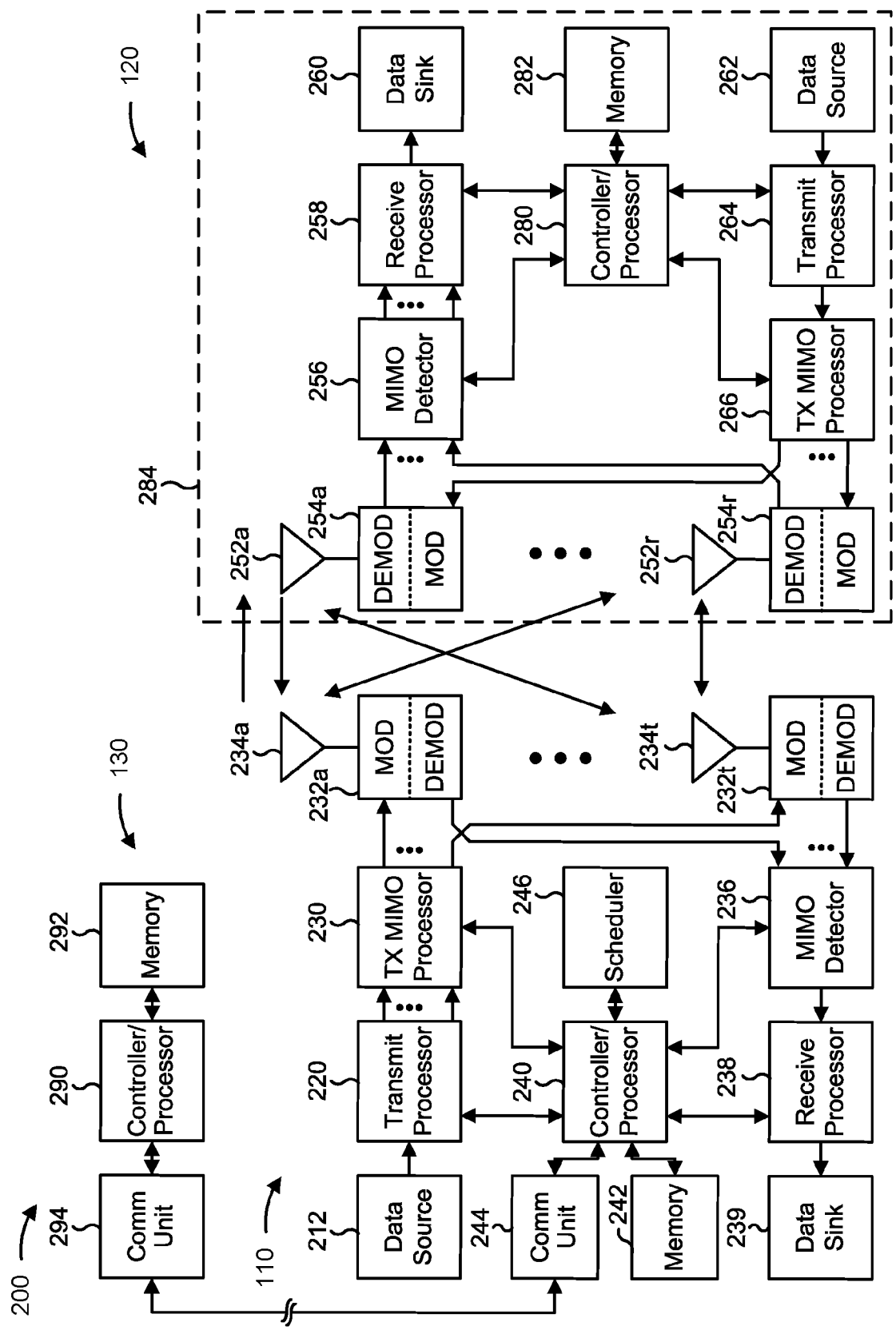
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-7.

Controller/processor 240 of base station 110, controller/processor 280 of UE 120, and/or any other component(s) of FIG. 2 may perform one or more techniques associated with beam parameter determination for channel repetitions, as described in more detail elsewhere herein. In some aspects, the wireless communication device described herein is the base station 110, is included in the base station 110, or includes one or more components of the base station 110 shown in FIG. 2. In some aspects, the wireless communication device described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, and/or other processes as described herein. In some aspects, executing instructions may include running the instructions, converting the instructions, compiling the instructions, and/or interpreting the instructions, among other examples.

In some aspects, the wireless communication device includes means for receiving at least one channel repetition of a plurality of channel repetitions, wherein the at least one channel repetition comprises an indication associated with a beam parameter; and/or means for performing a wireless communication action based at least in part on a determination associated with the beam parameter, wherein the determination associated with the beam parameter is based at least in part on an identification of a reference repetition occasion of a plurality of repetition occasions corresponding to the plurality of channel repetitions. In some aspects, the means for the wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the wireless communication device includes means for identifying the reference repetition occasion; and/or means for determining the application time based at least in part on applying a time offset to a starting time, wherein the starting time corresponds to the reference repetition occasion.

In some aspects, the wireless communication device includes means for identifying the reference repetition occasion; and/or means for determining the time duration for applying the non-default beam based at least in part on applying a time offset to a starting time, wherein the starting time corresponds to the reference repetition occasion.

In some aspects, the wireless communication device includes means for identifying the reference repetition occasion; and/or means for determining the beam switch timing based at least in part on applying a time offset to a starting time, wherein the starting time corresponds to the reference repetition occasion.

In some aspects, the wireless communication device includes means for identifying the reference repetition occasion; and/or means for determining the activation time for the beam update based at least in part on applying a time offset to a starting time, wherein the starting time corresponds to the reference repetition occasion. While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
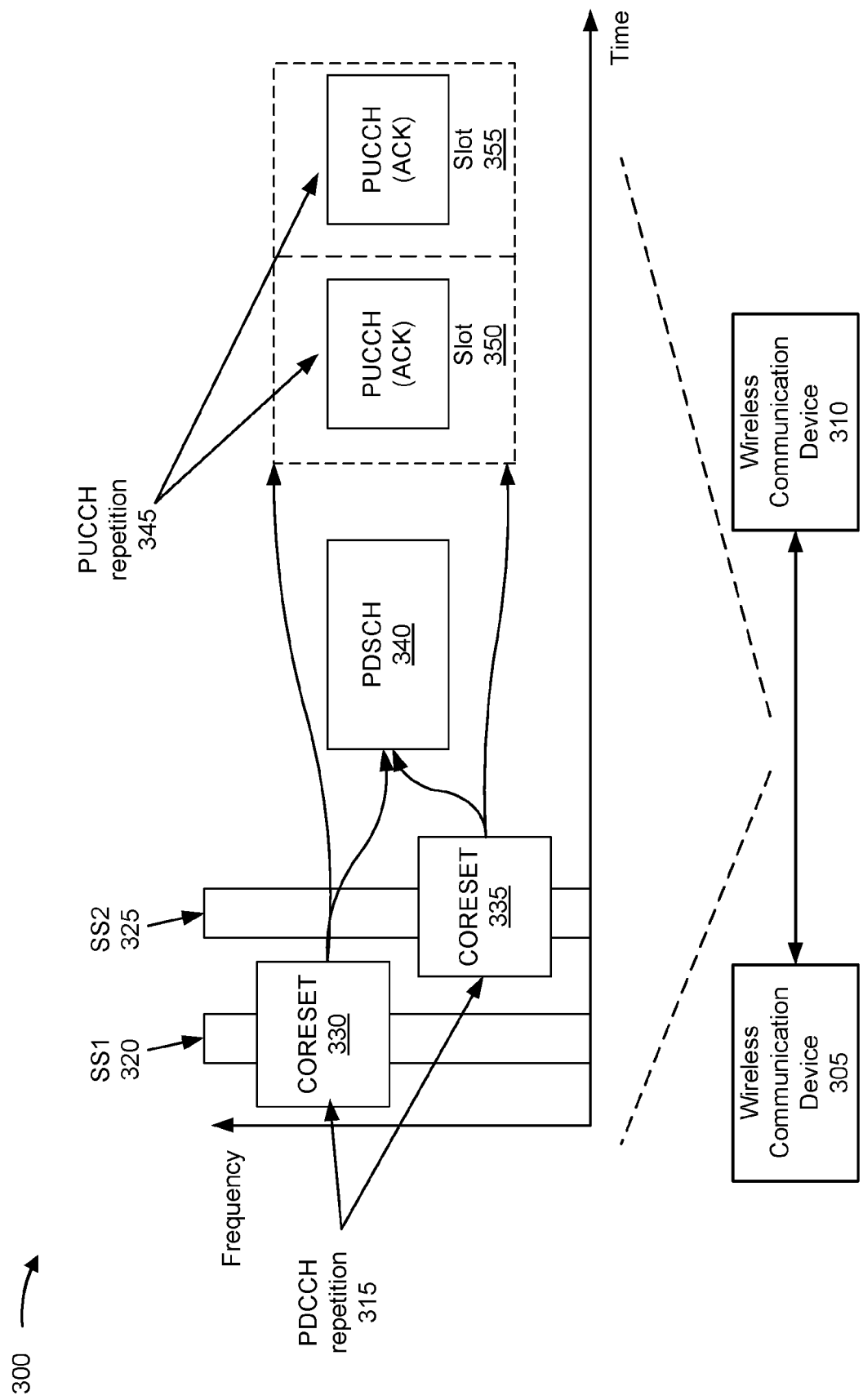
FIG. 3 is a diagram illustrating an example of wireless communications including channel repetitions, in accordance with various aspects of the present disclosure.

FIG. 3 is a diagram illustrating an example 300 of wireless communications including channel repetitions, in accordance with various aspects of the present disclosure. As shown in FIG. 3, a wireless communication device 305 and a wireless communication device 310 may communicate with one another. The wireless communication device 305 and the wireless communication device 310 may communicate with one another via a wireless network (e.g., the wireless network 100 shown in FIG. 1). The wireless communication device 305 and/or the wireless communication device 310 may be, for example, a UE, a base station, a relay station, and/or an integrated and access backhaul node, among other examples.

As shown, the wireless communication device 310 may repeat a transmission of a physical downlink control channel (PDCCH) communication, which may be referred to as a PDCCH repetition 315. As used herein, "repetition" refers to a communication that is transmitted more than one time and refers to the initial transmission of that communication or any subsequent retransmission of that communication. A repetition may be used to increase a signal-to-noise ratio (SNR) to improve transmission reliability.

The PDCCH repetition 315 may be repeated over a number of search spaces 320, 325. Each PDCCH repetition 315 may be associated with a different core resource set (CORESET) 330 and 335, respectively. The CORESETs 330 and 335 may be associated with different search spaces 320 and 325, a same search space 330 or 335, or different slots. Each PDCCH repetition 315 may be associated with a physical downlink shared channel (PDSCH) communication 340. For example, the PDCCH repetitions 315 may include downlink control information (DCI) that schedules and/or triggers the PDSCH communication 340. In some aspects, the PDSCH communication 340 may be a PDSCH repetition of a number of PDSCH repetitions. Similarly, as shown, the wireless communication device 305 may repeat a transmission of a physical uplink control channel (PUCCH) communication, which may be referred to as a PUCCH repetition 345. The PUCCH repetitions 345 may be transmitted over a number of slots 350 and 355. In some cases, as indicated by "ACK," the PUCCH repetitions 345 may carry acknowledgement indicators associated with the PDCCH repetitions 315. In some aspects, any number of repetitions of a communication may be transmitted.

The wireless communication device 305 and the wireless communication device 310 may use beamforming to facilitate communication with one another. One of the wireless communication devices 305 and 310 may indicate a beam to use for a communication to the other device. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

Antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array) can be dynamically controlled by modifying the phase shifts or phase offsets of the multiple signals relative to each other.

In 5G and other types of RATs, beamforming may be used for communications between a UE and a base station, such as for millimeter wave communications and/or the like. In such a case, the base station may provide the UE with a configuration of transmission configuration information (TCI) states that respectively indicate beams that may be used by the UE, such as for receiving a PDSCH. The base station may indicate an activated TCI state to the UE, which the UE may use to select a beam for receiving the PDSCH.

A beam indication is an indication of a beam. A beam indication may be, or include, a TCI state information element, a beam identifier (ID), spatial relation information, a TCI state ID, a close loop index, a panel ID, a TRP ID, and/or an SRS set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified transmission configuration indicator (TCI) framework. In some cases, the network may support layer 1 (L1)-based beam indication using at least UE-specific (unicast) DCI to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, the network may support common TI state identifier (ID) update and activation to provide common quasi co-location (QCL) information and/or common UL transmission spatial filter or filters across a set of configured component carriers (CCs). This type of beam indication may apply to intra-band CA, as well as to joint DL/UL and separate DL/UL beam indications. The common TCJ state ID may imply that one reference signal (RS) determined according to the TCI state(s) indicated by a common TCJ state ID is used to provide QCL Type-D indication and to determine UL transmission spatial filters across the set of configured CCs.

In some cases, time offsets may be defined for applying non-default beams. For example, a duration for applying the non-default beam may be specified as a timeDurationforQCL variable. The timeDurationforQCL variable may be a duration of time that enables a wireless communication device to prepare a non-default beam for reception of a communication. If the duration of time is not available, the wireless communication device may apply (e.g., prepare for use) a default beam. For example, a timeDurationForQCL variable may be defined such that if tci-PresentInDCI is set to "enabled" or tci-PresentForDCI-Format1-2-r16 is configured for the CORESET scheduling the PDSCH, and the time offset between the reception of the DL DCI and the corresponding PDSCH is equal to or greater than timeDurationForQCL, after a wireless communication device receives an initial higher layer configuration of TCJ states and before reception of the activation command, the wireless communication device may assume that the DM-RS ports of PDSCH of a serving cell are quasi co-located with the SS/PBCH block determined in the initial access procedure with respect to 'QCL-TypeA', and when applicable, also with respect to 'QCL-TypeD'.

In some aspects, the beam parameter may include a beam switch timing, which may be specified as a beamSwitchTiming variable. The beamSwitchTiming variable may be specified as a time duration that enables a wireless communication device to prepare an indicated new beam for the reception of channel state information reference signal (CSI-RS) resources. A beamSwitchTiming may also be defined such that if the scheduling offset between the last symbol of the PDCCH carrying the triggering DCI and the first symbol of aperiodic CSI-RS resources is equal to or greater than the wireless communication device reported threshold beamSwitchTiming when the reported value is one of the values of {14,28,48} and enableBeamSwitch Timing-r16 is not provided, or is equal to or greater than 48 when the reported value of beamSwitchTiming-r16 is one of the values of {224, 336} and enableBeamSwitchTiming-r16 is provided, the wireless communication device may be expected to apply the QCL assumptions in the indicated TCI states for the aperiodic CSI-RS resources in the CSI triggering state indicated by the CSI trigger field in DCI.

In some aspects, the beam parameter may include a beam reset timing. For example, a UE may be provided, by a parameter schedulingRequestID-BFR-SCell-r16, a configuration for PUCCH transmission with a link recovery request (LRR). The UE may transmit in a first physical uplink shared channel (PUSCH) medium access control control element (MAC CE) providing one or more indexes for at least one or more corresponding SCells having a radio link quality worse than a quality threshold, one or more indications of the presence of one or more indexes $q_{new}$ for corresponding secondary cells (SCells), and indexes $q_{new}$ for a periodic CSI-RS configuration or for a synchronization signal/physical broadcast channel (SS/PBCH) block provided by higher layers, if any, for corresponding SCells. After 28 symbols from a last symbol of a PDCCH reception with a DCI format scheduling a PUSCH transmission with a same hybrid automatic repeat request (HARQ) process number as for the transmission of the first PUSCH and having a toggled new data indicator (NDI) field value, the UE may monitor PDCCH in all core resource sets (CORESETs) on the SCells indicated by the MAC CE using the same antenna port quasi co-location parameters as the ones associated with the corresponding indexes $q_{new}$, if any and may transmit PUCCH on a PUCCH-SCell using a same spatial domain filter as the one corresponding to $q_{new}$ for periodic CSI-RS or SS/PBCH block reception, and using a power determined based on a specification, if the UE is provided a parameter PUCCH-SpatialRelationInfo for the PUCCH, a PUCCH with the LRR was either not transmitted or was transmitted on the primary cell (PCell) or the primary secondary cell group cell (PSCell), and the PUCCH-SCell is included in the SCells indicated by the MAC-CE, where the subcarrier spacing (SCS) configuration for the 28 symbols is the smallest of the SCS configurations of the active DL bandwidth part (BWP) for the PDCCH reception and of the active DL BWPs of the at least one SCell.

For the PCell or the PSCell, after 28 symbols from a last symbol of a first PDCCH reception in a search space set provided by a parameter recoverySearchSpaceId for which the UE detects a downlink control information (DCI) format with a cyclic redundancy check (CRC) scrambled by cell radio network temporary identifier (C-RNTI) or modulation and coding scheme (MCS)-C-RNTI, and until the UE receives an activation command for a parameter PUCCH-SpatialRelationInfo or is provided a parameter PUCCH-SpatialRelationInfo for PUCCH resources, the UE may transmit a PUCCH on a same cell as the physical random access channel (PRACH) transmission using a same spatial filter as for the last PRACH transmission, or a power determined based on a specification. For the PCell or the PSCell, after 28 symbols from a last symbol of a first PDCCH reception in a search space set provided by the parameter recoverySearchSpaceId where a UE detects a DCI format with CRC scrambled by C-RNTI or MCS-C-RNTI, the UE may assume the same antenna port quasi-colocation parameters as the ones associated with index $q_{new}$ for PDCCH monitoring in a CORESET with index 0.

In some cases, a wireless communication standard may indicate a formula for determining a transmit power control (TPC) timing for PUSCH. A portion of the formula may include a sum of TPC command values in a set $D_i$ of TPC command values with cardinality $C(D_i)$ that the UE receives between $K_{PUSCH}(i-i_0)-1$ symbols before PUSCH transmission occasion $i-i_0$ and $K_{PUSCH}(i)$ symbols before PUSCH transmission occasion i on active UL BWP b of carrier f of serving cell C for PUSCH power control adjustment state 1, where $i-i_0$ is the smallest integer for which $K_{PUSCH}(i-i_0)$ symbols before PUSCH transmission occasion $i-i_0$ is earlier than $K_{PUSCH}(i)$ symbols before PUSCH transmission occasion i. If a PUSCH transmission is scheduled by a DCI format, $K_{PUSCH}(i)$ is a number of symbols for active UL BWP b of carrier f of serving cell C after a last symbol of a corresponding PDCCH reception and before a first symbol of the PUSCH transmission.

In some cases, a wireless communication standard may indicate a formula for determining a TPC timing for PUCCH. A portion of the formula may include a sum of TPC command values in a set $C_i$ of TPC command values with cardinality $C(C_i)$ that the UE receives between $K_{PUSCH}(i-i_0)-1$ symbols before PUCCH transmission occasion $i-i_0$ and $K_{PUSCH}(i)$ symbols before PUCCH transmission occasion i on active UL BWP b of carrier f of serving cell C for PUCCH power control adjustment state, where $i_0>0$ is the smallest integer for which $K_{PUSCH}(i-i_0)$ symbols before PUCCH transmission occasion $i-i_0$ is earlier than $K_{PUSCH}(i)$ symbols before PUCCH transmission occasion i. If a PUCCH transmission is in response to a detection by the UE of a DCI format 1_0 or DCI format 1_1, $K_{PUSCH}(i)$ is a number of symbols for active UL BWP b of carrier f of serving cell C after a last symbol of a corresponding PDCCH reception and before a first symbol of the PUCCH transmission.

In some cases, a wireless communication standard may indicate a formula for determining a TPC timing for sounding reference signal (SRS). The formula may indicate the timing for a UE that is not configured for PUSCH transmissions on active UL BWP b of carrier f of serving cell C, or if the parameter srs-PowerControlAdjustmentStates indicates separate power control adjustment states between SRS transmissions and PUSCH transmissions, and if the parameter tpc-Accumulation is not provided. A portion of the formula may include a sum of TPC command values in a set $S_i$ of TPC command values with cardinality $C(S_i)$ that the UE receives between $K_{SRS}(i-i_0)-1$ symbols before SRS transmission occasion $i-i_0$ and $K_{SRS}(i)$ symbols before SRS transmission occasion i on active UL BWP b of carrier f of serving cell C for SRS power control adjustment state, where $i_0>0$ is the smallest integer for which $K_{SRS}(i-i_0)$ symbols before SRS transmission occasion $i-i_0$ is earlier than $K_{SRS}(i)$ symbols before SRS transmission occasion i. If an SRS transmission is a periodic, $K_{SRS}(i)$ is a number of symbols for active UL BWP b of carrier f of serving cell C after a last symbol of a corresponding PDCCH triggering the SRS transmisssion and before a first symbol of the SRS transmission.

In some cases, an aperiodic CSI report may occupy CSI processing units (CPUs) from the first symbol after the PDCCH triggering the CSI report until the last symbol between $Z_3$ symbols after the first symbol after the PDCCH triggering the CSI report and $Z_3'$ symbols after the last symbol of the latest one of each CSI-RS/SSB resource for channel measurement for L1-RSRP computation.

The various functionalities and supports described above may facilitate accurate and efficient beamforming, beam failure recovery, transmit power control, and/or CPU occupation. However, the timing of the events described depends on the receipt of an indication associated with a beam (e.g., a beam indication, an acknowledgment associated with a beam indication, a scheduling DCI). In the case of channel repetition, in which that indication may be transmitted more than once, there may be ambiguity as to which transmission to use as a reference for the timing of the events. Determining a timing based on the wrong transmission may lead to improper beamforming, which may have a negative impact on network performance.

Aspects of the techniques and apparatuses described herein provide for determining timing of events such as application times for beam indications and time offsets for applying default beams in channel repetition implementations by defining event timing in terms of reference repetition occasions. In some aspects, a wireless communication device may receive at least one channel repetition from another wireless communication device. The wireless communication device may identify a reference repetition occasion and perform a determination associated with a beam parameter based at least in part on the reference repetition occasion. In this way, aspects may facilitate signalling that supports beamforming in channel repetition implementations. As a result, such aspects have a positive impact on network performance.

As indicated above, FIG. 3 is provided as an example. Other examples may differ from what is described with regard to FIG. 3.

Figure 4:
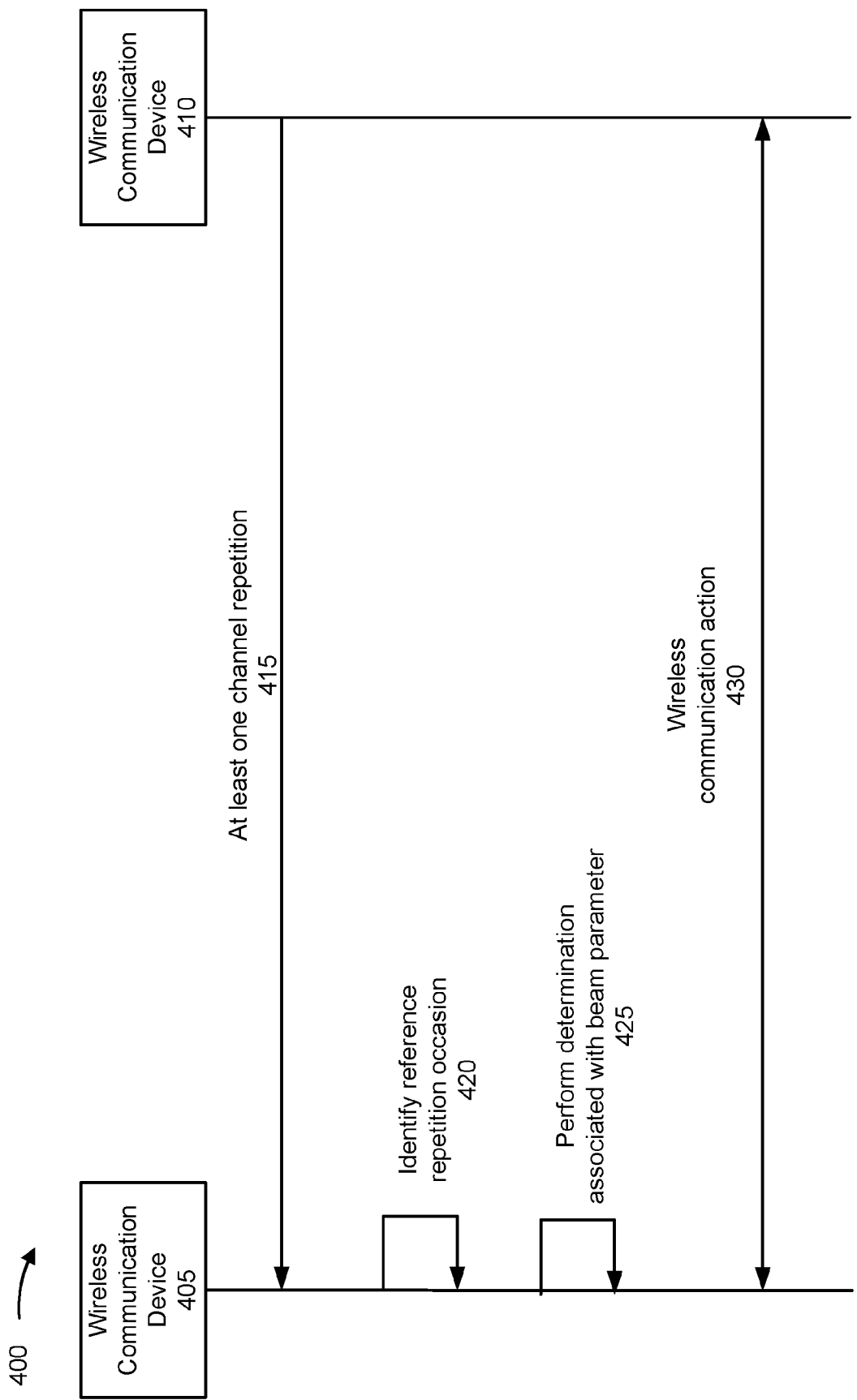
FIGS. 4-6 are diagrams illustrating examples associated with beam parameter determination for channel repetitions, in accordance with various aspects of the present disclosure.

FIG. 4 is a diagram illustrating an example 400 associated with beam parameter determination for channel repetitions, in accordance with various aspects of the present disclosure. As shown, a wireless communication device 405 and a wireless communication device 410 may communicate with one another. The wireless communication device 405 and/or the wireless communication device 410 may be, be similar to, or include the base station 110 and/or the UE 120 shown in FIG. 1.

As shown by reference number 415, the wireless communication device 410 may transmit, and the wireless communication device 405 may receive, at least one channel repetition of a plurality of channel repetitions. The at least one channel repetition may include a control channel repetition and/or a shared channel repetition. For example, the at least one channel repetition may include a physical downlink control channel (PDCCH) repetition, a physical uplink control channel (PUCCH) repetition, and/or a physical uplink shared channel (PUSCH) repetition.

The at least one channel repetition may include an indication associated with a beam parameter. In some aspects, the indication associated with the beam parameter may include a beam indication. In some aspects, the indication associated with the beam parameter may include an acknowledgment corresponding to a beam indication.

As shown by reference number 420, the wireless communication device may identify a reference repetition occasion of a plurality of repetition occasions corresponding to the plurality of channel repetitions and, as shown by reference number 425, may perform a determination associated with a beam parameter based at least in part on the identification of the reference repetition occasion. A repetition occasion is a time allocation associated with a nominal repetition or an actual repetition.

For example, for joint or separate DL/UL beam indication in a unified TCI framework where the beam indication is indicated as a unified TCI state, the application time of the beam indication, when the beam indication is received, may be the first slot that is separated from a reference PDCCH repetition of a plurality of PDCCH repetition occasions by a time offset. The time offset may be, for example, X milliseconds (ms), X slots, or Y symbols after the reference PDCCH repetition occasion. In some aspects, the unified TCI state may be a joint TI state, which provides the beam indication to at least one downlink channel and at least one uplink channel. In some aspects, the unified TCI state may be a separate DL common TCI state, which provides the beam indication to at least two downlink channels. In some aspects, the unified TCI state may be a separate UL common TCI state, which provides the beam indication to at least two uplink channels. A unified TCJ state as described herein may include at least one reference signal (e.g., a source reference signal) to provide a reference (e.g., a UE assumption) for determining QCL relationships, spatial filters, or the like to a target downlink or uplink channel.

In some aspects, for example, the beam parameter may include an application time associated with a beam identified by the beam indication. The wireless communication device 405 may identify the reference repetition occasion and determine the application time based at least in part on applying the time offset to a starting time. The starting time may correspond to the reference repetition occasion.

The reference repetition occasion may include a PDCCH repetition occasion associated with a CORESET pool index value that satisfies an index condition, where at least two PDCCH repetition occasions of the plurality of repetition occasions are associated with at least two CORESETs having different CORESET pool index values. For example, the reference repetition occasion may include a PDCCH repetition occasion with the highest CORESET pool index of the CORESET pool indexes corresponding to the repetition occasions, the lowest CORESET pool index, and/or a CORESET pool index that satisfies a CORESET pool index threshold.

In some aspects, the reference repetition occasion may include a PDCCH repetition occasion associated with a CORESET ID that satisfies a CORESET ID condition. For example, the reference repetition occasion may include a PDCCH with the highest CORESET ID of the CORESET IDs corresponding to the repetition occasions, the lowest CORESET ID, and/or a CORESET ID that satisfies a CORESET ID threshold. In some aspects, the reference repetition occasion may include a PDCCH repetition occasion associated with a search space ID that satisfies a search space ID condition. For example, the reference repetition occasion may include a PDCCH with the highest search space ID of the search space IDs corresponding to the repetition occasions, the lowest search space ID, and/or a search space ID that satisfies a CORESET ID threshold.

The reference repetition occasion may include a PDCCH repetition occasion associated with a PDCCH monitoring occasion that satisfies a monitoring occasion condition. For example, the reference repetition occasion may include a PDCCH with the earliest PDCCH monitoring occasion of the PDCCH monitoring occasions corresponding to the repetition occasions, the latest PDCCH monitoring occasion, and/or a PDCCH monitoring occasion that satisfies a PDCCH monitoring occasion threshold.

The reference repetition occasion may include a PDCCH repetition occasion associated with a PDCCH reference symbol that satisfies a reference symbol condition. For example, the reference repetition occasion may include a PDCCH with the earliest PDCCH reference symbol of the PDCCH reference symbol (e.g., a starting or ending symbol of a corresponding occasion), the latest PDCCH reference symbol, and/or a PDCCH reference symbol that satisfies a PDCCH reference symbol threshold.

The reference repetition occasion may include a PDCCH repetition occasion associated with a resource index that satisfies a resource index condition. For example, the reference repetition occasion may include a PDCCH repetition occasion associated with a highest resource index of the resource indexes associated with the repetition occasions, the PDCCH repetition occasion associated with a lowest resource index, and/or a PDCCH repetition occasion associated with a resource index that satisfies a resource index threshold. The resource index may be an index of resource blocks or resource elements associated with the PDCCH repetition occasion.

The reference repetition occasion may include a PDCCH repetition occasion associated with a PDCCH candidate index that satisfies a candidate index condition. For example, the reference repetition occasion may include a PDCCH repetition occasion associated with a highest PDCCH candidate index of the PDCCH candidate indexes associated with the repetition occasions, the PDCCH repetition occasion associated with a lowest PDCCH candidate index, and/or a PDCCH repetition occasion associated with a PDCCH candidate index that satisfies a PDCCH candidate index threshold.

The reference repetition occasion may include a PDCCH repetition occasion associated with a starting control channel element (CCE) index that satisfies a starting CCE index condition. For example, the reference repetition occasion may include a PDCCH repetition occasion associated with a highest CCE index of the CCE indexes associated with the repetition occasions, the PDCCH repetition occasion associated with a lowest CCE index, and/or a PDCCH repetition occasion associated with a CCE index that satisfies a CCE index threshold.

The reference repetition occasion may include a PDCCH repetition occasion associated with a TCI state ID that satisfies a TCI state ID condition. For example, the reference repetition occasion may include a PDCCH repetition occasion associated with a highest TCI state ID of the TI state IDs associated with the repetition occasions, the PDCCH repetition occasion associated with a lowest TCI state ID, and/or a PDCCH repetition occasion associated with a TCI state ID that satisfies a TCI state ID threshold.

The reference repetition occasion may include a PDCCH repetition occasion associated with an ID corresponding to an antenna panel that satisfies a panel ID condition. For example, the reference repetition occasion may include a PDCCH repetition occasion associated with a TCI state ID that indicates an antenna port that is quasi co-located (QCLed) to an antenna port associated with a highest synchronization signal block (SSB) index of the SSB indexes associated with the repetition occasions, the PDCCH repetition occasion associated with a TCI state ID that indicates an antenna port that is QCLed to an antenna port associated with a lowest SSB index, and/or a PDCCH repetition occasion associated with a TCI state ID that indicates an antenna port that is QCLed to an antenna port associated with an SSB index that satisfies an SSB index threshold. In some aspects, the reference repetition occasion may include a PDCCH repetition occasion associated with a highest panel ID and/or TRP ID, the PDCCH repetition occasion associated with a lowest panel ID and/or TRP ID, and/or a PDCCH repetition occasion associated with a panel ID and/or TRP ID that satisfies a panel ID threshold.

In some aspects, for example, the beam parameter may include a time duration for applying a non-default beam. The wireless communication device 405 may identify the reference repetition occasion and determine the time duration for applying the non-default beam based at least in part on applying a time offset to a starting time. The starting time may correspond to the reference repetition occasion. According to some aspects, the duration for applying the non-default beam may be specified as a timeDurationforQCL variable. The timeDurationforQCL variable may be determined as a duration between a reference time occasion for the reception of a DL DCI and a corresponding PDSCH (e.g., that is scheduled by the DCI), that enables the wireless communication device 405 to prepare the indicated new beam for the reception of the PDSCH communication. The reference time occasion may be determined as a reference repetition occasion, as described above, and may be one or more of the reference PDCCH repetition occasions described above with regard to determining application of a beam indicator.

In some aspects, the beam parameter may include a beam switch timing, which may be specified as a beamSwitchTiming variable. The wireless communication device 405 may identify the reference repetition occasion and determine the beam switch timing based at least in part on applying a time offset to a starting time, where the starting time corresponds to the reference repetition occasion. The beamSwitchTiming variable may be specified as a time duration between the last symbol of a PDCCH reference repetition occasion carrying a triggering DCI and a first symbol of an aperiodic CSI-RS resource, that enables the wireless communication device 405 to prepare the indicated new beam for the reception of CSI-RS resource.

In some aspects, the beam parameter may include a beam reset timing associated with a beam failure recovery procedure. For example, the beam parameter may include a beam reset timing after a response from a base station for the beam failure recovery procedure. The wireless communication device 405 may identify the reference repetition occasion and determine the beam reset timing based at least in part on applying a time offset to a starting time, where the starting time corresponds to the reference repetition occasion. The starting time may be a last symbol of the reference repetition occasion.

In some aspects, the at least one channel repetition may include a plurality of PDCCH repetitions and the reference repetition may include a last PDCCH repetition occasion of a plurality of PDCCH repetition occasions corresponding to the plurality of PDCCH repetitions. For example, the beam reset timing may be defined as 28 symbols from a last symbol of a PDCCH repetition, or the last PDCCH reception occasion if multiple PDCCH receptions are linked, with a DCI format scheduling a PUSCH transmission with a same HARQ process number as for the transmission of the first PUSCH. For example, a UE may be provided, by a parameter schedulingRequestID-BFR-SCell-r16, a configuration for PUCCH transmission with a link recovery request (LRR). The UE may transmit in a first physical uplink shared channel (PUSCH) medium access control control element (MAC CE) providing one or more indexes for at least one or more corresponding SCells having a radio link quality worse than a quality threshold, one or more indications of the presence of one or more indexes $q_{new}$ for corresponding secondary cells (SCells), and indexes $q_{new}$ for a periodic CSI-RS configuration or for a synchronization signal/physical broadcast channel (SS/PBCH) block provided by higher layers, if any, for corresponding SCells. After 28 symbols from a last symbol of a PDCCH reception or one last PDCCH reception occasion if multiple PDCCH reception occasions are linked with a DCI format scheduling a PUSCH transmission with a same hybrid automatic repeat request (HARQ) process number as for the transmission of the first PUSCH and having a toggled new data indicator (NDI) field value, the UE may monitor PDCCH in all core resource sets (CORESETs) on the SCells indicated by the MAC CE using the same antenna port quasi co-location parameters as the ones associated with the corresponding indexes $q_{new}$, if any and may transmit PUCCH on a PUCCH-SCell using a same spatial domain filter as the one corresponding to $q_{new}$ for periodic CSI-RS or SS/PBCH block reception.

In some aspects, for a PCell or PSCell, the beam reset timing may have a starting time associated with 28 symbols from a last symbol of a first PDCCH reception, or the last PDCCH reception occasion if multiple PDCCH receptions are linked to a first PDCCH reception, in a search space set provided by a parameter recoverySearchSpaceId for which the UE detects a DCI format with CRC scrambled by C-RNTI or MCS-C-RNTI and until the UE receives an activation command for the parameter PUCCH-SpatialRelationInfo or is provided PUCCH-SpatialRelationInfo for PUCCH resources. In some aspects, for a PCell or PSCell, the beam reset timing may have a starting time associated with 28 symbols from a last symbol of a first PDCCH reception, or the last PDCCH reception occasion if multiple PDCCH receptions are linked to a first PDCCH reception, in a search space set provided by the parameter recoverySearchSpaceId where a UE detects a DCI format with CRC scrambled by C-RNTI or MCS-C-RNTI.

In some aspects, the beam parameter comprises a TPC applicable timing and the wireless communication device 405 may identify the reference repetition occasion and determine the TPC applicable timing based at least in part on applying a time offset to a starting time. The starting time may correspond to the reference repetition occasion. In some aspects, the starting time may include a last symbol of the reference repetition occasion.

For example, if a PUSCH transmission is scheduled by a DCI format, $K_{PUSCH}(i)$ may be a number of symbols for active UL BWP b of carrier f of serving cell C after a last symbol of a corresponding PDCCH reception, or the last PDCCH reception occasion if multiple PDCCH receptions are linked to the PDCCH reception, and before a first symbol of the PUSCH transmission. In some aspects, if the PUCCH transmission is in response to a detection by the UE of a DCI format 1_0 or DCI format 1_1, $K_{PUCCH}(i)$ may be a number of symbols for active UL BWP b of carrier f of primary cell C after a last symbol of a corresponding PDCCH reception, or the last PDCCH reception occasion if multiple PDCCH receptions are linked to the PDCCH reception, and before a first symbol of the PUCCH transmission. In some aspects, if the SRS transmission is aperiodic, $K_{SRS}(i)$ may be a number of symbols for active UL BWP b of carrier f of serving cell C after a last symbol of a corresponding PDCCH triggering the SRS transmission, or the last PDCCH reception occasion if multiple PDCCH receptions are linked to the PDCCH reception, and before a first symbol of the SRS transmission.

In some aspects, the beam parameter may include a CPU occupation duration. The wireless communication device 405 may identify the reference repetition occasion and determine the CPU occupation duration based at least in part on applying a time offset to a starting time. The starting time may correspond to the reference repetition occasion. For example, the starting time may include a last symbol of the reference repetition occasion. In some aspects, the reference repetition may include a last PDCCH repetition occasion of a plurality of PDCCH repetition occasions corresponding to a plurality of PDCCH repetitions.

For example, in some aspects, an aperiodic CSI report may occupy one or more CPUs from the first symbol after the PDCCH triggering the CSI report, or the last PDCCH reception occasion if multiple PDCCH receptions are linked to the PDCCH reception, and until the last symbol between $Z_3$ symbols after the first symbol after the PDCCH triggering the CSI report, or the last PDCCH reception occasion if multiple PDCCH receptions are linked to the PDCCH reception, and $Z_3'$ symbols after the last symbol of the latest one of each CSI-RS/SSB resource for channel measurement for L1-RSRP computation.

In some aspects, for joint or separate DL/UL beam indication in a unified TCI framework, the application time of the beam indication, when the beam indication is received, may be the first slot that is separated from a reference PUCCH or PUSCH repetition of a plurality of PUCCH or PUSCH repetition occasions by a time offset. The time offset may be, for example, X ms, X slots, or Y symbols after the reference PUCCH or PUSCH repetition occasion. The reference PUCCH or PUSCH repetition occasion may be determined as further described below with reference to FIG. 5.

In some aspects, when receiving an indication for common TCI state ID update and activation providing common QCL information and/or common UL transmission spatial filters across a set of configured component carriers in a carrier aggregation configuration, the wireless communication device 405 may apply the activated TCI or TCIs starting from the first slot that follows a slot k+X, where k is the slot in which the wireless communication device 405 would transmit a PUCCH or PUSCH occasion carrying an acknowledgment corresponding to the indication for common TCI state ID update. The PUCCH or PUSCH repetition carrying the indication may correspond to the reference repetition occasion, which may be determined as further described below with reference to FIG. 6.

As shown by reference number 430, the wireless communication device 405 may perform a wireless communication action based at least in part on a determination associated with the beam parameter. For example, in some aspects, the wireless communication device 405 may apply an indicated beam, apply a default beam, and/or update a beam, among other examples.

As indicated above, FIG. 4 is provided as an example. Other examples may differ from what is described with regard to FIG. 4.

Figure 5:
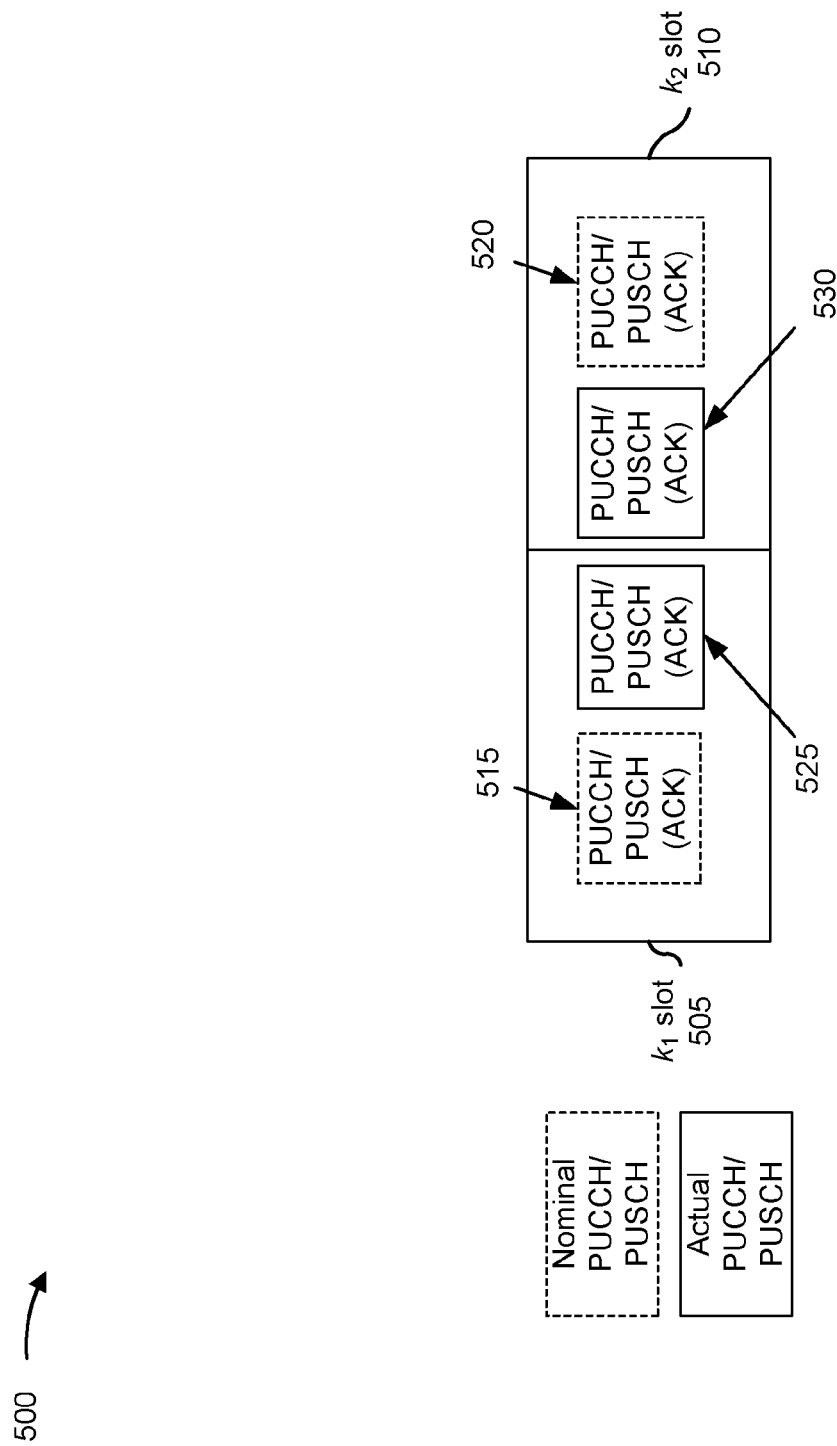

FIG. 5 is a diagram illustrating an example 500 associated with beam parameter determination for channel repetitions, in accordance with various aspects of the present disclosure. The example 500 illustrates a first slot 505 (shown as "$k_1$ slot") and a second slot 510 (shown as "$k_2$ slot"), in which PUCCH repetition occasions or PUSCH repetition occasions are scheduled (shown as "PUCCH/PUSCH"). Each PUCCH/PUSCH repetition occasion may be configured for carrying an acknowledgment (shown as "ACK") of a received joint or separate DL/UL beam indication.

In some aspects, for joint or separate DL/UL beam indication in a unified TCI framework, the application time of the beam indication, when the beam indication is received, may be the first slot that is separated from a reference PUCCH or PUSCH repetition of a plurality of PUCCH or PUSCH repetition occasions by a time offset. The time offset may be, for example, X ms, X slots, or Y symbols after the reference PUCCH or PUSCH repetition occasion.

In some aspects, the reference PUCCH or PUSCH repetition occasion may be a boundary repetition occasion of the plurality of repetition occasions. For example, as shown, the reference PUCCH or PUSCH repetition occasion may be a first nominal PUCCH or PUSCH repetition occasion 515. "Nominal" repetition occasion may refer to a repetition occasion corresponding to a repetition that is not sent (e.g., due to being cancelled). The reference PUCCH or PUSCH repetition occasion may be a last nominal PUCCH or PUSCH repetition occasion 520. In some aspects, the reference PUCCH or PUSCH repetition occasion may be a first actual PUCCH or PUSCH repetition occasion 525. "Actual" repetition occasion may refer to a repetition occasion corresponding to a repetition that is transmitted. The reference PUCCH or PUSCH repetition occasion may be a last actual PUCCH or PUSCH repetition occasion 530.

In some aspects, the reference repetition occasion may include a repetition occasion associated with an antenna parameter that satisfies an antenna parameter condition. The antenna parameter may indicate a spatial relation, a TCI state ID, a close loop index, a panel ID, a TRP ID, and/or a sounding reference signal (SRS) set ID, among other examples.

Each PUCCH or PUSCH repetition occasion may be configured for carrying an acknowledgment (shown as "ACK") of a received indication for common TCI state ID update and activation providing common QCL information and/or common UL transmission spatial filters across a set of configured component carriers in a carrier aggregation configuration.

In some aspects, a wireless communication device may apply the activated TCI or TCIs starting from the first slot that follows a slot k+X, where k is the slot in which the wireless communication device would transmit a PUCCH or PUSCH repetition during a PUCCH or PUSCH repetition occasion. The PUCCH or PUSCH repetition may carry an acknowledgment corresponding to a received indication for common TCI state ID update. The PUCCH or PUSCH repetition carrying the indication may correspond to the reference repetition occasion, determined as described above.

As indicated above, FIG. 5 is provided as an example. Other examples may differ from what is described with regard to FIG. 5.

Figure 6:
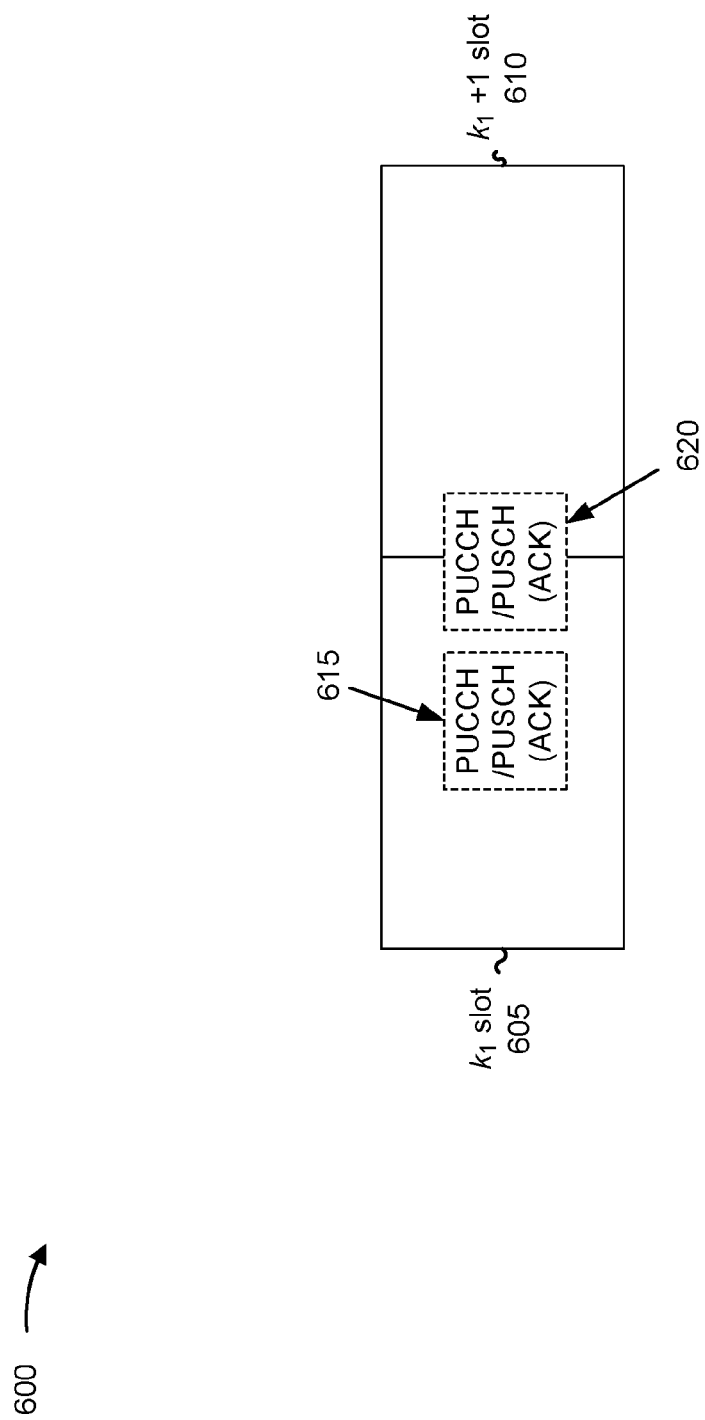

FIG. 6 is a diagram illustrating an example 600 associated with beam parameter determination for channel repetitions, in accordance with various aspects of the present disclosure. The example 600 illustrates a first slot 605 (shown as "$k_1$ slot") and a second slot 610 (shown as "$k_1+1$ slot"), in which PUCCH repetition occasions or PUSCH repetition occasions 615 and 620 are scheduled (shown as "PUCCH/PUSCH"). Each PUCCH/PUSCH repetition occasion may be configured for carrying an acknowledgment (shown as "ACK") of a received joint or separate DL/UL beam indication. As shown, a PUCCH or PUSCH repetition occasion 620 may span two adjacent slots.

In some aspects, the reference repetition occasion may correspond to a slot having a starting symbol of a nominal repetition occasion (e.g., the $k_1$ slot, which may include a starting symbol of the first nominal repetition occasion or the second nominal repetition occasion). In some aspects, the reference repetition occasion corresponds to a slot having an ending symbol of a nominal repetition occasion (e.g., the $k_1$ slot, which may include an ending symbol of the first nominal repetition occasion 610, or the $k_1+1$ slot, which may include an ending symbol of the second nominal repetition occasion 620).

As indicated above, FIG. 6 is provided as an example. Other examples may differ from what is described with regard to FIG. 6.

Figure 7:
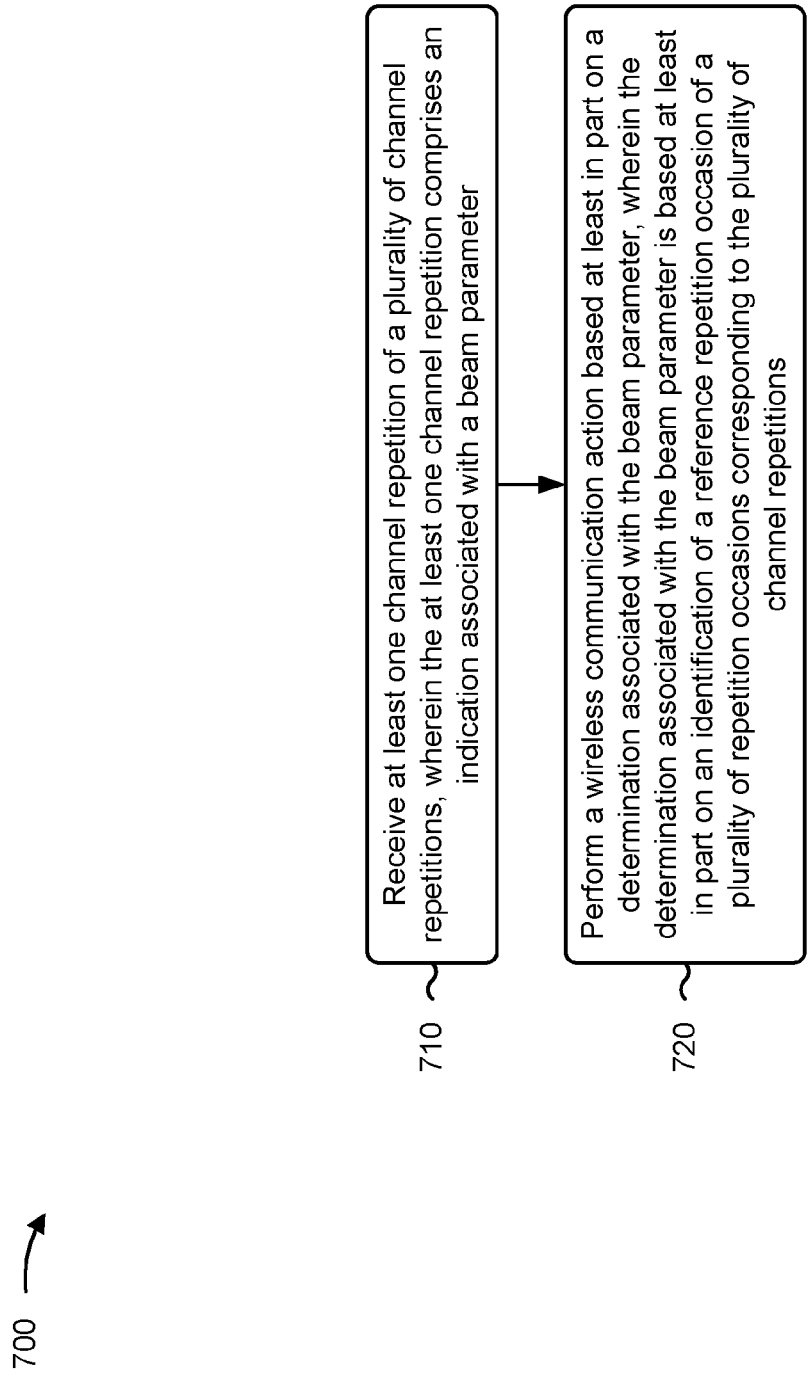
FIG. 7 is a diagram illustrating an example process associated with beam parameter determination for channel repetitions, in accordance with various aspects of the present disclosure.

FIG. 7 is a diagram illustrating an example process 700 performed, for example, by a wireless communication device, in accordance with various aspects of the present disclosure. Example process 700 is an example where the wireless communication device (e.g., wireless communication device 405) performs operations associated with beam parameter determination for channel repetitions.

As shown in FIG. 7, in some aspects, process 700 may include receiving at least one channel repetition of a plurality of channel repetitions, wherein the at least one channel repetition comprises an indication associated with a beam parameter (block 710). For example, the wireless communication device (e.g., using reception component 802, depicted in FIG. 8) may receive at least one channel repetition of a plurality of channel repetitions, wherein the at least one channel repetition comprises an indication associated with a beam parameter, as described above.

As further shown in FIG. 7, in some aspects, process 700 may include performing a wireless communication action based at least in part on a determination associated with the beam parameter, wherein the determination associated with the beam parameter is based at least in part on an identification of a reference repetition occasion of a plurality of repetition occasions corresponding to the plurality of channel repetitions (block 720). For example, the wireless communication device (e.g., using reception component 802, transmission component 804, and/or determination component 808, depicted in FIG. 8) may perform a wireless communication action based at least in part on a determination associated with the beam parameter, wherein the determination associated with the beam parameter is based at least in part on an identification of a reference repetition occasion of a plurality of repetition occasions corresponding to the plurality of channel repetitions, as described above.

Process 700 may include additional aspects, such as any single aspect or any combination of aspects described below and/or in connection with one or more other processes described elsewhere herein.

In a first aspect, the indication associated with the beam parameter comprises a beam indication.

In a second aspect, alone or in combination with the first aspect, the beam parameter comprises an application time associated with a beam identified by the beam indication, and process 700 further comprises identifying the reference repetition occasion, and determining the application time based at least in part on applying a time offset to a starting time, wherein the starting time corresponds to the reference repetition occasion.

In a third aspect, alone or in combination with one or more of the first and second aspects, the at least one channel repetition comprises at least one PDCCH repetition.

In a fourth aspect, alone or in combination with one or more of the first through third aspects, the reference repetition occasion comprises a PDCCH repetition occasion associated with a CORESET pool index value that satisfies an index condition, and at least two PDCCH repetition occasions of the plurality of repetition occasions are associated with at least two CORESETs having different CORESET pool index values.

In a fifth aspect, alone or in combination with one or more of the first through fourth aspects, the reference repetition occasion comprises a PDCCH repetition occasion associated with a CORESET ID that satisfies a CORESET ID condition.

In a sixth aspect, alone or in combination with one or more of the first through fifth aspects, the reference repetition occasion comprises a PDCCH repetition occasion associated with a search space ID that satisfies a search space ID condition.

In a seventh aspect, alone or in combination with one or more of the first through sixth aspects, the reference repetition occasion comprises a PDCCH repetition occasion associated with a PDCCH monitoring occasion that satisfies a monitoring occasion condition.

In an eighth aspect, alone or in combination with one or more of the first through seventh aspects, the reference repetition occasion comprises a PDCCH repetition occasion associated with a PDCCH reference symbol that satisfies a reference symbol condition.

In a ninth aspect, alone or in combination with one or more of the first through eighth aspects, the reference repetition occasion comprises a PDCCH repetition occasion associated with a resource index that satisfies a resource index condition.

In a tenth aspect, alone or in combination with one or more of the first through ninth aspects, the reference repetition occasion comprises a PDCCH repetition occasion associated with a PDCCH candidate index that satisfies a candidate index condition.

In an eleventh aspect, alone or in combination with one or more of the first through tenth aspects, the reference repetition occasion comprises a PDCCH repetition occasion associated with a starting CCE index that satisfies a starting CCE index condition.

In a twelfth aspect, alone or in combination with one or more of the first through eleventh aspects, the reference repetition occasion comprises a PDCCH repetition occasion associated with a transmission TCI state ID that satisfies a TCI state ID condition.

In a thirteenth aspect, alone or in combination with one or more of the first through twelfth aspects, the reference repetition occasion comprises a PDCCH repetition occasion associated with an ID corresponding to a panel that satisfies a panel ID condition.

In a fourteenth aspect, alone or in combination with one or more of the first through thirteenth aspects, the beam parameter comprises a time duration for applying a non-default beam, and process 700 further comprises identifying the reference repetition occasion, and determining the time duration for applying the non-default beam based at least in part on applying a time offset to a starting time, wherein the starting time corresponds to the reference repetition occasion.

In a fifteenth aspect, alone or in combination with one or more of the first through fourteenth aspects, the beam parameter comprises a beam switch timing, and process 700 further comprises identifying the reference repetition occasion, and determining the beam switch timing based at least in part on applying a time offset to a starting time, wherein the starting time corresponds to the reference repetition occasion.

In a sixteenth aspect, alone or in combination with one or more of the first through fifteenth aspects, the beam parameter comprises a beam reset timing associated with a beam failure recovery procedure, and process 700 further comprises identifying the reference repetition occasion, and determining the beam reset timing based at least in part on applying a time offset to a starting time, wherein the starting time corresponds to the reference repetition occasion.

In a seventeenth aspect, alone or in combination with the sixteenth aspect, the starting time comprises a last symbol of the reference repetition occasion.

In an eighteenth aspect, alone or in combination with one or more of the sixteenth through seventeenth aspects, the at least one channel repetition comprises a plurality of PDCCH repetitions, and the reference repetition comprises a last PDCCH repetition occasion of a plurality of PDCCH repetition occasions corresponding to the plurality of PDCCH repetitions.

In a nineteenth aspect, alone or in combination with one or more of the sixteenth through eighteenth aspects, the beam failure recovery procedure is associated with a primary cell.

In a twentieth aspect, alone or in combination with one or more of the sixteenth through nineteenth aspects, the beam failure recovery procedure is associated with a secondary cell.

In a twenty-first aspect, alone or in combination with one or more of the first through twentieth aspects, the beam parameter comprises a transmit power command applicable timing, and process 700 further comprises identifying the reference repetition occasion, and determining the transmit power command applicable timing based at least in part on applying a time offset to a starting time, wherein the starting time corresponds to the reference repetition occasion.

In a twenty-second aspect, alone or in combination with the twenty-first aspect, the starting time comprises a last symbol of the reference repetition occasion.

In a twenty-third aspect, alone or in combination with one or more of the twenty-first through twenty-second aspects, the at least one channel repetition comprises a plurality of PDCCH repetitions, and the reference repetition comprises a last PDCCH repetition occasion of a plurality of PDCCH repetition occasions corresponding to the plurality of PDCCH repetitions.

In a twenty-fourth aspect, alone or in combination with one or more of the first through twenty-third aspects, the beam parameter comprises a CPU occupation duration, and process 700 further comprises identifying the reference repetition occasion, and determining the CPU occupation duration based at least in part on applying a time offset to a starting time, wherein the starting time corresponds to the reference repetition occasion.

In a twenty-fifth aspect, alone or in combination with the twenty-fourth aspects, the starting time comprises a last symbol of the reference repetition occasion.

In a twenty-sixth aspect, alone or in combination with one or more of the twenty-fourth through twenty-fifth aspects, the at least one channel repetition comprises a plurality of PDCCH repetitions, and the reference repetition comprises a last PDCCH repetition occasion of a plurality of PDCCH repetition occasions corresponding to the plurality of PDCCH repetitions.

In a twenty-seventh aspect, alone or in combination with one or more of the first through twenty-sixth aspects, the at least one channel repetition comprises at least one of a PUCCH repetition or a PUSCH repetition.

In a twenty-eighth aspect, alone or in combination with the twenty-seventh aspect, the reference repetition occasion comprises a boundary repetition occasion of the plurality of repetition occasions.

In a twenty-ninth aspect, alone or in combination with the twenty-eighth aspect, the boundary repetition occasion corresponds to at least one of a nominal repetition or an actual repetition.

In a thirtieth aspect, alone or in combination with the twenty-ninth aspect, the reference repetition occasion comprises a repetition occasion associated with an antenna parameter that satisfies an antenna parameter condition.

In a thirty-first aspect, alone or in combination with one or more of the twenty-seventh through thirtieth aspects, the antenna parameter indicates at least one of a spatial relation, a TCI state ID, a close loop index, a panel ID, a total radiated power ID, or a sounding reference signal set ID.

In a thirty-second aspect, alone or in combination with one or more of the twenty-seventh through thirty-first aspects, the reference repetition occasion spans two adjacent slots, and the reference repetition occasion corresponds to a slot having a starting symbol of a nominal repetition occasion.

In a thirty-third aspect, alone or in combination with one or more of the twenty-seventh through thirty-second aspects, the reference repetition occasion spans two adjacent slots, and the reference repetition occasion corresponds to a slot having an ending symbol of a nominal repetition occasion.

In a thirty-fourth aspect, alone or in combination with one or more of the twenty-seventh through thirty-third aspects, the beam parameter comprises an activation time for a beam update associated with a set of configured component carriers, and process 700 further comprises identifying the reference repetition occasion, and determining the activation time for the beam update based at least in part on applying a time offset to a starting time, wherein the starting time corresponds to the reference repetition occasion.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
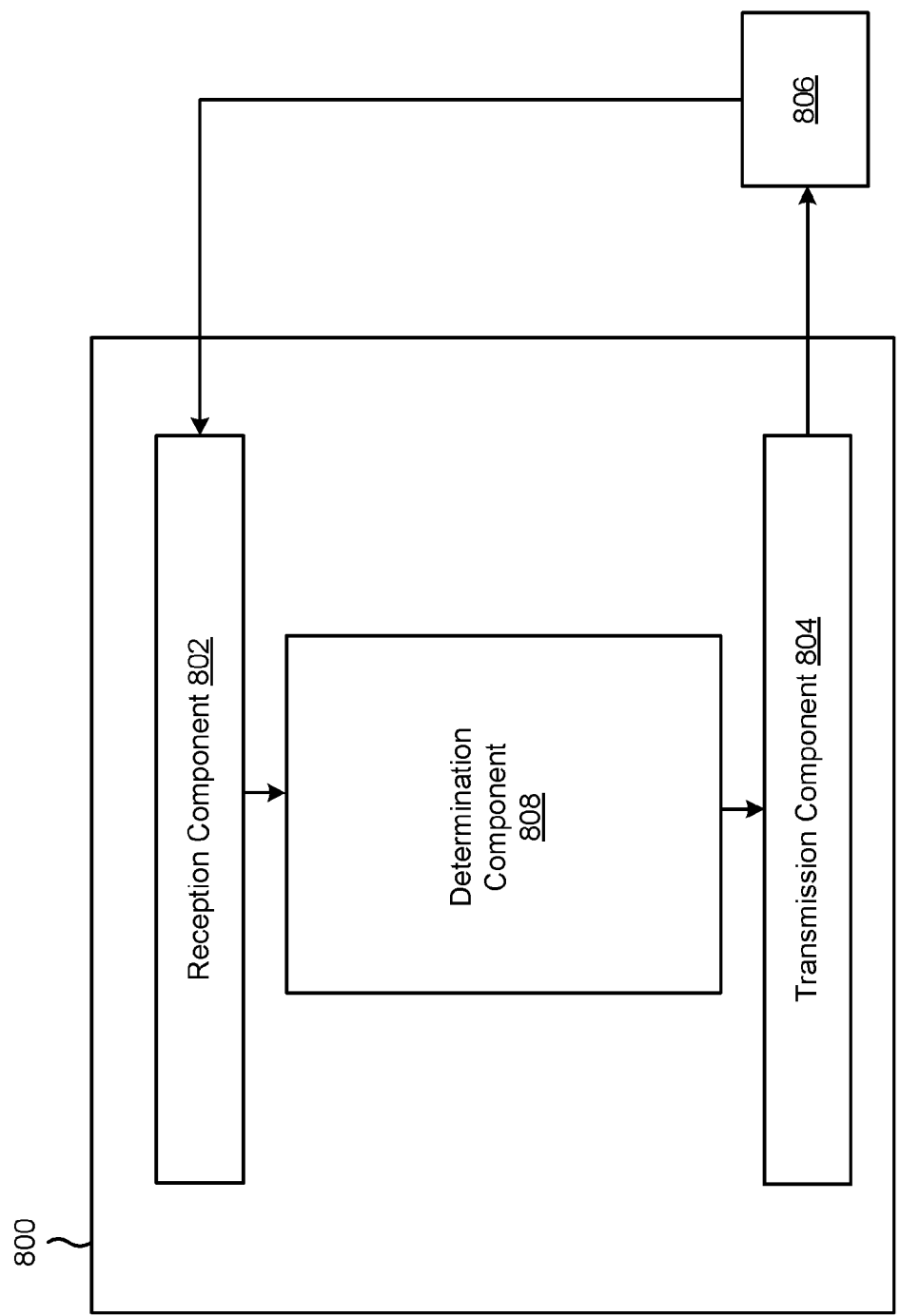
FIG. 8 is a block diagram of an example apparatus for wireless communication, in accordance with various aspects of the present disclosure.

FIG. 8 is a block diagram of an example apparatus 800 for wireless communication. The apparatus 800 may be a wireless communication device, or a wireless communication device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808.

In some aspects, the apparatus 800 may be configured to perform one or more operations described herein in connection with FIGS. 4-6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE and/or the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the wireless communication device described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the wireless communication device described above in connection with FIG. 2. In some aspects, the transmission component 804 may be co-located with the reception component 802 in a transceiver.

The reception component 802 may receive at least one channel repetition of a plurality of channel repetitions, wherein the at least one channel repetition comprises an indication associated with a beam parameter. The reception component 802, transmission component 804, and/or determination component 808 may perform a wireless communication action based at least in part on a determination associated with the beam parameter, wherein the determination associated with the beam parameter is based at least in part on an identification of a reference repetition occasion of a plurality of repetition occasions corresponding to the plurality of channel repetitions. In some aspects, the transmission component 804 may include one or more antennas, a modulator, a transmit MIMO processor, a transmit processor, a controller/processor, a memory, or a combination thereof, of the wireless communication device described above in connection with FIG. 2. In some aspects, the determination component 808 may include the reception component 802 and/or the transmission component 804.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some aspects of the present disclosure:

Aspect 1: A method of wireless communication performed by a wireless communication device, comprising: receiving at least one channel repetition of a plurality of channel repetitions, wherein the at least one channel repetition comprises an indication associated with a beam parameter; and performing a wireless communication action based at least in part on a determination associated with the beam parameter, wherein the determination associated with the beam parameter is based at least in part on an identification of a reference repetition occasion of a plurality of repetition occasions corresponding to the plurality of channel repetitions.

Aspect 2: The method of aspect 1, wherein the indication associated with the beam parameter comprises a beam indication.

Aspect 3: The method of aspect 2, wherein the beam parameter comprises an application time associated with a beam identified by the beam indication, and wherein the method further comprises: identifying the reference repetition occasion; and determining the application time based at least in part on applying a time offset to a starting time, wherein the starting time corresponds to the reference repetition occasion.

Aspect 4: The method of any of aspects 1-3, wherein the at least one channel repetition comprises at least one physical downlink control channel (PDCCH) repetition.

Aspect 5: The method of aspect 4, wherein the reference repetition occasion comprises a PDCCH repetition occasion associated with a control resource set (CORESET) pool index value that satisfies an index condition, and wherein at least two PDCCH repetition occasions of the plurality of repetition occasions are associated with at least two CORESETs having different CORESET pool index values.

Aspect 6: The method of either of aspects 4 or 5, wherein the reference repetition occasion comprises a PDCCH repetition occasion associated with a control resource set (CORESET) identifier (ID) that satisfies a CORESET ID condition.

Aspect 7: The method of any of aspects 4-6, wherein the reference repetition occasion comprises a PDCCH repetition occasion associated with a search space identifier (ID) that satisfies a search space ID condition.

Aspect 8: The method of any of aspects 4-7, wherein the reference repetition occasion comprises a PDCCH repetition occasion associated with a PDCCH monitoring occasion that satisfies a monitoring occasion condition.

Aspect 9: The method of any of aspects 4-8, wherein the reference repetition occasion comprises a PDCCH repetition occasion associated with a PDCCH reference symbol that satisfies a reference symbol condition.

Aspect 10: The method of any of aspects 4-9, wherein the reference repetition occasion comprises a PDCCH repetition occasion associated with a resource index that satisfies a resource index condition.

Aspect 11: The method of any of aspects 4-10, wherein the reference repetition occasion comprises a PDCCH repetition occasion associated with a PDCCH candidate index that satisfies a candidate index condition.

Aspect 12: The method of any of aspects 4-11, wherein the reference repetition occasion comprises a PDCCH repetition occasion associated with a starting control channel element (CCE) index that satisfies a starting CCE index condition.

Aspect 13: The method of any of aspects 4-12, wherein the reference repetition occasion comprises a PDCCH repetition occasion associated with a transmission configuration indicator (TCI) state ID that satisfies a TCI state ID condition.

Aspect 14: The method of any of aspects 4-13, wherein the reference repetition occasion comprises a PDCCH repetition occasion associated with an identifier (ID) corresponding to a panel that satisfies a panel ID condition.

Aspect 15: The method of any of aspects 4-14, wherein the beam parameter comprises a time duration for applying a non-default beam, and wherein the method further comprises: identifying the reference repetition occasion; and determining the time duration for applying the non-default beam based at least in part on applying a time offset to a starting time, wherein the starting time corresponds to the reference repetition occasion.

Aspect 16: The method of any of aspects 4-15, wherein the beam parameter comprises a beam switch timing, and wherein the method further comprises: identifying the reference repetition occasion; and determining the beam switch timing based at least in part on applying a time offset to a starting time, wherein the starting time corresponds to the reference repetition occasion.

Aspect 17: The method of any of aspects 4-16, wherein the beam parameter comprises a beam reset timing associated with a beam failure recovery procedure, and wherein the method further comprises: identifying the reference repetition occasion; and determining the beam reset timing based at least in part on applying a time offset to a starting time, wherein the starting time corresponds to the reference repetition occasion.

Aspect 18: The method of aspect 17, wherein the starting time comprises a last symbol of the reference repetition occasion.

Aspect 19: The method of either of aspects 17 or 18, wherein the at least one channel repetition comprises a plurality of PDCCH repetitions, and wherein the reference repetition comprises a last PDCCH repetition occasion of a plurality of PDCCH repetition occasions corresponding to the plurality of PDCCH repetitions.

Aspect 20: The method of any of aspects 17-19, wherein the beam failure recovery procedure is associated with a primary cell.

Aspect 21: The method of any of aspects 17-20, wherein the beam failure recovery procedure is associated with a secondary cell.

Aspect 22: The method of any of aspects 4-21, wherein the beam parameter comprises a transmit power command applicable timing, and wherein the method further comprises: identifying the reference repetition occasion; and determining the transmit power command applicable timing based at least in part on applying a time offset to a starting time, wherein the starting time corresponds to the reference repetition occasion.

Aspect 23: The method of aspect 22, wherein the starting time comprises a last symbol of the reference repetition occasion.

Aspect 24: The method of either of aspects 22 or 23, wherein the at least one channel repetition comprises a plurality of PDCCH repetitions, and wherein the reference repetition comprises a last PDCCH repetition occasion of a plurality of PDCCH repetition occasions corresponding to the plurality of PDCCH repetitions.

Aspect 25: The method of any of aspects 4-24, wherein the beam parameter comprises a CSI processing unit (CPU) occupation duration, and wherein the method further comprises: identifying the reference repetition occasion; and determining the CPU occupation duration based at least in part on applying a time offset to a starting time, wherein the starting time corresponds to the reference repetition occasion.

Aspect 26: The method of aspect 25, wherein the starting time comprises a last symbol of the reference repetition occasion.

Aspect 27: The method of either of aspects 25 or 26, wherein the at least one channel repetition comprises a plurality of PDCCH repetitions, and wherein the reference repetition comprises a last PDCCH repetition occasion of a plurality of PDCCH repetition occasions corresponding to the plurality of PDCCH repetitions.

Aspect 28: The method of any of aspects 1-27, wherein the at least one channel repetition comprises at least one of a physical uplink control channel (PUCCH) repetition or a physical uplink shared channel (PUSCH) repetition.

Aspect 29: The method of aspect 28, wherein the reference repetition occasion comprises a boundary repetition occasion of the plurality of repetition occasions.

Aspect 30: The method of aspect 29, wherein the boundary repetition occasion corresponds to at least one of a nominal repetition or an actual repetition.

Aspect 31: The method of any of aspects 28-30, wherein the reference repetition occasion comprises a repetition occasion associated with an antenna parameter that satisfies an antenna parameter condition.

Aspect 32: The method of aspect 31, wherein the antenna parameter indicates at least one of: a spatial relation, a transmission configuration indicator (TCI) state identifier (ID), a close loop index, a panel ID, a total radiated power ID, or a sounding reference signal set ID.

Aspect 33: The method of any of aspects 28-32, wherein the reference repetition occasion spans two adjacent slots, and wherein the reference repetition occasion corresponds to a slot having a starting symbol of a nominal repetition occasion.

Aspect 34: The method of any of aspects 28-33, wherein the reference repetition occasion spans two adjacent slots, and wherein the reference repetition occasion corresponds to a slot having an ending symbol of a nominal repetition occasion.

Aspect 35: The method of any of aspects 28-34, wherein the beam parameter comprises an activation time for a beam update associated with a set of configured component carriers, and wherein the method further comprises: identifying the reference repetition occasion; and determining the activation time for the beam update based at least in part on applying a time offset to a starting time, wherein the starting time corresponds to the reference repetition occasion.

Aspect 36: An apparatus for wireless communication at a device, comprising a processor; memory coupled with the processor; and instructions stored in the memory and executable by the processor to cause the apparatus to perform the method of one or more aspects of aspects 1-35.

Aspect 37: A device for wireless communication, comprising a memory and one or more processors coupled to the memory, the memory and the one or more processors configured to perform the method of one or more aspects of aspects 1-35.

Aspect 38: An apparatus for wireless communication, comprising at least one means for performing the method of one or more aspects of aspects 1-35.

Aspect 39: A non-transitory computer-readable medium storing code for wireless communication, the code comprising instructions executable by a processor to perform the method of one or more aspects of aspects 1-35.

Aspect 40: A non-transitory computer-readable medium storing a set of instructions for wireless communication, the set of instructions comprising one or more instructions that, when executed by one or more processors of a device, cause the device to perform the method of one or more aspects of aspects 1-35.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:
 a memory; and
 one or more processors coupled to the memory, the memory and the one or more processors configured to:
  receive at least one channel repetition of a plurality of channel repetitions, wherein the at least one channel repetition comprises an indication associated with a beam parameter; and
  perform a wireless communication action based at least in part on a determination associated with the beam parameter, wherein the determination associated with the beam parameter is based at least in part on an identification of a reference repetition occasion of a plurality of repetition occasions corresponding to the plurality of channel repetitions, wherein the at least one channel repetition comprises at least one physical downlink control channel (PDCCH) repetition, and wherein the reference repetition occasion comprises a PDCCH repetition occasion associated with a PDCCH reference symbol that satisfies a reference symbol condition.

2. The wireless communication device of claim 1, wherein the indication associated with the beam parameter comprises a beam indication.

3. The wireless communication device of claim 2,
wherein the beam parameter comprises an application time associated with a beam identified by the beam indication, and wherein the memory and the one or more processors are further configured to:
identify the reference repetition occasion; and
determine the application time based at least in part on applying a time offset to a starting time, wherein the starting time corresponds to the reference repetition occasion.

4. The wireless communication device of claim 1, wherein the memory and the one or more processors are further configured to:
perform another wireless communication action based at least in part on another determination associated with another beam parameter, wherein the other determination associated with the other beam parameter is based at least in part on an identification of another reference repetition occasion of the plurality of repetition occasions corresponding to the plurality of channel repetitions, wherein the other reference repetition occasion comprises a PDCCH repetition occasion associated with a control resource set (CORESET) pool index value that satisfies an index condition, and wherein at least two PDCCH repetition occasions of the plurality of repetition occasions are associated with at least two CORESETs having different CORESET pool index values.

5. The wireless communication device of claim 1, wherein the memory and the one or more processors are further configured to:
perform another wireless communication action based at least in part on another determination associated with another beam parameter, wherein the other determination associated with the other beam parameter is based at least in part on an identification of another reference repetition occasion of the plurality of repetition occasions corresponding to the plurality of channel repetitions, and wherein the other reference repetition occasion comprises a PDCCH repetition occasion associated with a control resource set (CORESET) identifier (ID) that satisfies a CORESET ID condition.

6. The wireless communication device of claim 1, wherein the memory and the one or more processors are further configured to:
perform another wireless communication action based at least in part on another determination associated with another beam parameter, wherein the other determination associated with the other beam parameter is based at least in part on an identification of another reference repetition occasion of the plurality of repetition occasions corresponding to the plurality of channel repetitions, and wherein the other reference repetition occasion comprises a PDCCH repetition occasion associated with a search space identifier (ID) that satisfies a search space ID condition.

7. The wireless communication device of claim 1, wherein the memory and the one or more processors are further configured to:
perform another wireless communication action based at least in part on another determination associated with another beam parameter, wherein the other determination associated with the other beam parameter is based at least in part on an identification of another reference repetition occasion of the plurality of repetition occasions corresponding to the plurality of channel repetitions, and wherein the other reference repetition occasion comprises a PDCCH repetition occasion associated with a PDCCH monitoring occasion that satisfies a monitoring occasion condition.

8. The wireless communication device of claim 1, wherein the memory and the one or more processors are further configured to:
perform another wireless communication action based at least in part on another determination associated with another beam parameter, wherein the other determination associated with the other beam parameter is based at least in part on an identification of another reference repetition occasion of the plurality of repetition occasions corresponding to the plurality of channel repetition, and wherein the other reference repetition occasion comprises a PDCCH repetition occasion associated with a resource index that satisfies a resource index condition.

9. The wireless communication device of claim 1, wherein the memory and the one or more processors are further configured to:
perform another wireless communication action based at least in part on another determination associated with another beam parameter, wherein the other determination associated with the other beam parameter is based at least in part on an identification of another reference repetition occasion of the plurality of repetition occasions corresponding to the plurality of channel repetitions, and wherein the other reference repetition occasion comprises a PDCCH repetition occasion associated with a PDCCH candidate index that satisfies a candidate index condition.

10. The wireless communication device of claim 1, wherein the memory and the one or more processors are further configured to:
perform another wireless communication action based at least in part on another determination associated with another beam parameter, wherein the other determination associated with the other beam parameter is based at least in part on an identification of another reference repetition occasion of the plurality of repetition occasions corresponding to the plurality of channel repetition, and wherein the other reference repetition occasion comprises a PDCCH repetition occasion associated with a starting control channel element (CCE) index that satisfies a starting CCE index condition.

11. The wireless communication device of claim 1, wherein the memory and the one or more processors are further configured to:
perform another wireless communication action based at least in part on another determination associated with another beam parameter, wherein the other determination associated with the other beam parameter is based at least in part on an identification of another reference repetition occasion of the plurality of repetition occasions corresponding to the plurality of channel repetition, and wherein the other reference repetition occasion comprises a PDCCH repetition occasion associated with a transmission configuration indicator (TCI) state identifier (ID) that satisfies a TCI state ID condition.

12. The wireless communication device of claim 1, wherein the memory and the one or more processors are further configured to:
perform another wireless communication action based at least in part on another determination associated with another beam parameter, wherein the other determination associated with the other beam parameter is based at least in part on an identification of another reference repetition occasion of the plurality of repetition occasions corresponding to the plurality of channel repetitions, and wherein the other reference repetition occasion comprises a PDCCH repetition occasion associated with an identifier (ID) corresponding to a panel that satisfies a panel ID condition.

13. The wireless communication device of claim 1, wherein the memory and the one or more processors are further configured to:
perform another wireless communication action based at least in part on another determination associated with another beam parameter, wherein the other determination associated with the other beam parameter is based at least in part on an identification of another reference repetition occasion of the plurality of repetition occasions corresponding to the plurality of channel repetitions, wherein the other beam parameter comprises a time duration for applying a non-default beam, and wherein the memory and the one or more processors are further configured to:
identify the other reference repetition occasion; and
determine the time duration for applying the non-default beam based at least in part on applying a time offset to a starting time, wherein the starting time corresponds to the other reference repetition occasion.

14. The wireless communication device of claim 1, wherein the memory and the one or more processors are further configured to:
perform another wireless communication action based at least in part on another determination associated with another beam parameter, wherein the other determination associated with the other beam parameter is based at least in part on an identification of another reference repetition occasion of the plurality of repetition occasions corresponding to the plurality of channel repetitions, wherein the other beam parameter comprises a beam switch timing, and wherein the memory and the one or more processors are further configured to:
identify the other reference repetition occasion; and
determine the beam switch timing based at least in part on applying a time offset to a starting time, wherein the starting time corresponds to the other reference repetition occasion.

15. The wireless communication device of claim 1, wherein the memory and the one or more processors are further configured to:
perform another wireless communication action based at least in part on another determination associated with another beam parameter, wherein the other determination associated with the other beam parameter is based at least in part on an identification of another reference repetition occasion of the plurality of repetition occasions corresponding to the plurality of channel repetitions, wherein the other beam parameter comprises a beam reset timing associated with a beam failure recovery procedure associated with a primary cell or a secondary cell, and wherein the memory and the one or more processors are further configured to:
identify the other reference repetition occasion; and
determine the beam reset timing based at least in part on applying a time offset to a starting time, wherein the starting time corresponds to the other reference repetition occasion.

16. The wireless communication device of claim 15, wherein the starting time comprises a last symbol of the other reference repetition occasion, and wherein the at least one channel repetition comprises a plurality of PDCCH repetitions, and wherein the other reference repetition occasion comprises a last PDCCH repetition occasion of a plurality of PDCCH repetition occasions corresponding to the plurality of PDCCH repetitions.

17. The wireless communication device of claim 1, wherein the memory and the one or more processors are further configured to:
perform another wireless communication action based at least in part on another determination associated with another beam parameter, wherein the other determination associated with the other beam parameter is based at least in part on an identification of another reference repetition occasion of the plurality of repetition occasions corresponding to the plurality of channel repetitions, wherein the other beam parameter comprises a transmit power command applicable timing, and wherein the memory and the one or more processors are further configured to:
identify the other reference repetition occasion; and
determine the transmit power command applicable timing based at least in part on applying a time offset to a starting time, wherein the starting time corresponds to the other reference repetition occasion.

18. The wireless communication device of claim 17, wherein the starting time comprises a last symbol of the other reference repetition occasion.

19. The wireless communication device of claim 17, wherein the at least one channel repetition comprises a plurality of PDCCH repetitions, and wherein the reference repetition occasion comprises a last PDCCH repetition occasion of a plurality of PDCCH repetition occasions corresponding to the plurality of PDCCH repetitions.

20. The wireless communication device of claim 1, wherein the memory and the one or more processors are further configured to:
perform another wireless communication action based at least in part on another determination associated with another beam parameter, wherein the other determination associated with the other beam parameter is based at least in part on an identification of another reference repetition occasion of the plurality of repetition occasions corresponding to the plurality of channel repetitions, wherein the beam parameter comprises a channel state information (CSI) processing unit (CPU) occupation duration, and wherein the memory and the one or more processors are further configured to:
identify the other reference repetition occasion; and
determine the CPU occupation duration based at least in part on applying a time offset to a starting time, wherein the starting time corresponds to the other reference repetition occasion.

21. The wireless communication device of claim 20, wherein the starting time comprises a last symbol of the other reference repetition occasion, wherein the at least one channel repetition comprises a plurality of PDCCH repetitions, and wherein the other reference repetition occasion comprises a last PDCCH repetition occasion of a plurality of PDCCH repetition occasions corresponding to the plurality of PDCCH repetitions.

22. The wireless communication device of claim 1, wherein the at least one channel repetition comprises at least one of a physical uplink control channel (PUCCH) repetition or a physical uplink shared channel (PUSCH) repetition.

23. The wireless communication device of claim 22, wherein the reference repetition occasion comprises a boundary repetition occasion of the plurality of repetition occasions.

24. The wireless communication device of claim 23, wherein the boundary repetition occasion corresponds to at least one of a nominal repetition or an actual repetition.

25. The wireless communication device of claim 22, wherein the reference repetition occasion comprises a repetition occasion associated with an antenna parameter that satisfies an antenna parameter condition.

26. The wireless communication device of claim 25, wherein the antenna parameter indicates at least one of:
   a spatial relation,
   a transmission configuration indicator (TCI) state identifier (ID),
   a close loop index,
   a panel ID,
   a total radiated power ID, or
   a sounding reference signal set ID.

27. The wireless communication device of claim 22, wherein the reference repetition occasion spans two adjacent slots, and wherein the reference repetition occasion corresponds to a slot having at least one of a starting symbol of a nominal repetition occasion or an ending symbol of a nominal repetition occasion.

28. The wireless communication device of claim 22, wherein the beam parameter comprises an activation time for a beam update associated with a set of configured component carriers, and wherein the memory and the one or more processors are further configured to:
   identify the reference repetition occasion; and
   determine the activation time for the beam update based at least in part on applying a time offset to a starting time, wherein the starting time corresponds to the reference repetition occasion.

29. A method of wireless communication performed by a wireless communication device, comprising:
   receiving at least one channel repetition of a plurality of channel repetitions, wherein the at least one channel repetition comprises an indication associated with a beam parameter; and
   performing a wireless communication action based at least in part on a determination associated with the beam parameter, wherein the determination associated with the beam parameter is based at least in part on an identification of a reference repetition occasion of a plurality of repetition occasions corresponding to the plurality of channel repetitions, wherein the at least one channel repetition comprises at least one physical downlink control channel (PDCCH) repetition, and wherein the reference repetition occasion comprises a PDCCH repetition occasion associated with a PDCCH reference symbol that satisfies a reference symbol condition.

30. The method of claim 29, wherein the indication associated with the beam parameter comprises a beam indication, and wherein the beam parameter comprises an application time associated with a beam identified by the beam indication, and wherein the method further comprises:
   identifying the reference repetition occasion; and
   determining the application time based at least in part on applying a time offset to a starting time, wherein the starting time corresponds to the reference repetition occasion.

* * * * *